Figure 1:
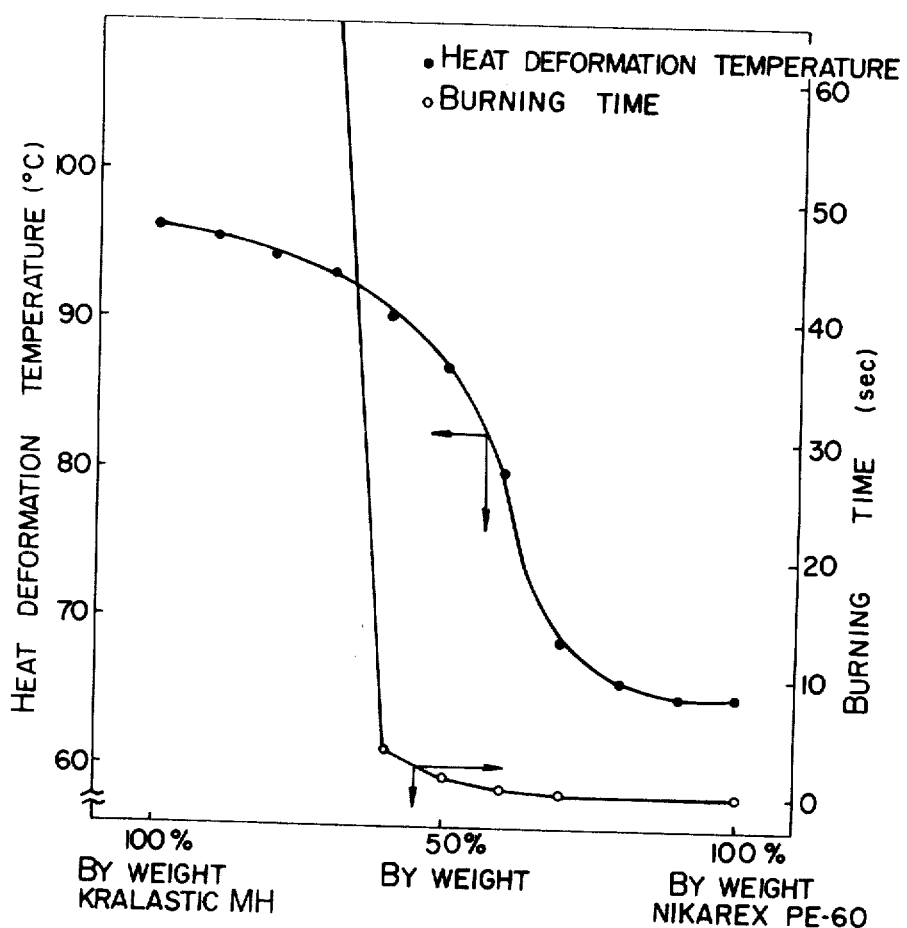

United States Patent [19]
Koshida et al.

[11] 3,959,407
[45] May 25, 1976

[54] THERMOPLASTIC RESIN COMPOSITION

[75] Inventors: Toshiro Koshida, Kobe; Yasuo Nakagawa, Nishinomiya, both of Japan

[73] Assignee: Sumitomo Bakelite Company, Limited, Tokyo, Japan

[22] Filed: Mar. 13, 1974

[21] Appl. No.: 450,905

[30] Foreign Application Priority Data
Mar. 17, 1973  Japan............................... 48-30523
Sept. 19, 1973 Japan............................. 48-104957

[52] U.S. Cl............................ 260/876 R; 260/889; 260/891; 428/462
[51] Int. Cl.² ........................................ C08L 51/04
[58] Field of Search............ 260/876 R, 880 R, 889, 260/891; 428/462; 117/133

[56] References Cited
UNITED STATES PATENTS
2,802,809   8/1957   Hayes............................. 260/876 R

*Primary Examiner*—Murray Tillman
*Assistant Examiner*—J. Ziegler
*Attorney, Agent, or Firm*—Karl W. Flocks

[57] ABSTRACT

A vinyl chloride polymer composition consisting essentially of 60 to 40 % by weight of a vinyl chloride-propylene copolymer and 40 to 60 % by weight of at least one interpolymer selected from the group consisting of acrylonitrile-butadiene-styrene terpolymers and acrylonitrile-methyl methacrylate-butadiene-styrene quadripolymers. This composition has a heat deformation temperature of 75° to 90°C and is capable of easily giving by injection molding an article having a good surface appearance, a good gloss due to its excellent moldability and excellent impact resistance.

8 Claims, 3 Drawing Figures

THERMOPLASTIC RESIN COMPOSITION

This invention relates to a thermoplastic resin composition which is improved in dimensional stability at elevated temperatures, moldability, and impact resistance, and more particularly, to an improvement of a vinyl chloride polymer composition.

Because of their heat deformation temperature of up to about 70°C, molded articles comprising unplasticized polyvinyl chloride compound may be used for those machine parts which are required to withstand temperatures within said range such as those of household electrical appliances and of automobiles, whereas they cannot be used for those parts which are required to withstand temperatures higher than said heat deformation temperature. The injection molding of polyvinyl chloride is quite difficult, because the fused resin temperature suitable for the molding is close to the decomposition temperature of polyvinyl chloride. Further, since gaseous hydrogen chloride is set free on decomposition of polyvinyl chloride, it is necessary to pay attention to corrosion of the metallic mold and to working environment. Such disadvantages have incurred reluctance among molders in accepting the injection molding of polyvinyl chloride. Consequently, polyvinyl chloride has so far been used only in production of small-sized molded articles such as pipe joints, switchboard housings, water collecting pieces for gutter, and telephone housings and parts.

The term "heat deformation temperature" as used in this Specification and Claims means the heat deformation temperature as measured in conformity with the testing method specified in ASTM D 648 (under a fiber stress of 66 psi).

On the other hand, as for the large-sized molded articles which require a dimensional stability at elevated temperatures, there have been widely used those thermoplastics which are hardly susceptible to decomposition during the injection molding cycle, such as, for example, polystyrene and ABS resin which is an acrylonitrile-butadiene copolymer grafted with styrene. Articles of polystyrene and ABS resins, however, have such disadvantages as lack of self-distinguishing property and surface gloss characteristic of polyvinyl chloride articles, low mar resistance, and low resistance to organic solvents. Underwriters' Laboratories, Inc., has recently revised UL-492, standard for radio and television receiving appliances, to establish flammability standards for plastic materials to be used. Although there have been developed flame resistant polystyrene or ABS resins by incorporating in polystyrene or ABS resins such flame retardants or flame retarding aids as antimony trioxide, halogen compounds, and phosphorus compounds, such flame resistant resins are inferior in electrical characteristics, thermal stability, and moldability, and are more expensive than plain resins, while no improvement can be seen in such disadvantages of the resins themselves as inferior surface gloss, low mar resistance, and low solvent resistance. Moreover, the flame retardants or flame retarding aids used will unavoidably contaminate the natural environment, because they are difficult to degrade, that is, accumulative, and toxic. Therefore, the general trend is to place restrictions by law upon the use of such agents, so that their diminished availability may be anticipated in the future.

Such a disadvantage of polystyrene or ABS can be eliminated by use of polyvinyl chloride which has self-extinguishing property. However, because of its low heat deformation temperature and difficult molding, polyvinyl chloride raises another problem which places limits upon the type of articles moldable from polyvinyl chloride. Accordingly, there have heretofore been made various attempts to raise the heat deformation temperature of articles comprising polyvinyl chloride as a major component. One of the results of such attempts is chlorinated polyvinyl chloride which is obtained by reacting polyvinyl chloride with gaseous chlorine in an aqueous medium and is known to have an improved heat deformation temperature. The heat deformation temperature rises with an increase in chlorine content to reach, as is known, as high at 100°C. The use field of polyvinyl chloride might be expected to expand by chlorination because of increased heat deformation temperature. However, chlorination results in a marked deterioration in both impact strength and moldability and thus prevents expansion of the use field of chlorinated polyvinyl chloride. In the case of chlorinated polyvinyl chloride, with an increase in chlorine content the fusion temperature becomes higher and the flow becomes inferior so that not only the injection molding but also, in some cases, the granulation become impossible.

Another method for improving the heat deformation temperature of molded articles is to use a so-called fiber glass-reinforced polyvinyl chloride molding compound obtained by mixing polyvinyl chloride with glass fibers. Although the articles obtained from the fiber glass-reinforced polyvinyl chloride molding compound by injection molding is excellent in dimensional stability, and mechanical strengths, said compound has such a defect that the glass fibers contained in it wear the screw and cylinder of the molding machine or the mold cavity during the injection molding operation. Further, since the compound contains glass fibers, it is inferior in moldability to polyvinyl chloride itself, and hence, the injection molding of a large-sized article from the compound is very difficult. Moreover, since the glass fibers contained in the compound appear on the surface of the molded article to decrease the surface gloss, the fiber glass-reinforced polyvinyl chloride molding compound is not suited for used in molding those articles which are required to be of beautiful appearance.

As a result of various investigations conducted to overcome aforesaid disadvantages, the present inventors have found out a vinyl chloride polymer composition having an improved impact resistance, which may easily be injection molded to give a thin-walled article, a large-sized article, or a complicated article having desirable appearance and gloss and capable of retaining dimensional stability at at temperature as high as 75° to 90°C.

An object of this invention is to provide a thermoplastic resin composition capable of giving an article having self-extinguishing property and a heat deformation temperature of 75° to 90°C.

Another object of this invention is to provide a resin composition comprising a vinyl chloride-propylene copolymer and an interpolymer, which may give a thin-walled article, a large-sized article, or a complicated article having a good appearance and a good gloss due to the excellent moldability of the resin composition.

A further object of this invention is to provide a thermoplastic resin composition having an improved impact resistance and an improved dimensional stability at elevated temperatures.

Other objects and advantages of this invention will become apparent from the following description.

According to this invention, there is provided a vinyl chloride polymer composition consisting essentially of 60 to 40 % by weight of a vinyl chloride-propylene copolymer (hereinafter abbreviated to Vc-PP copolymer) and 40 to 60 % by weight of at least one interpolymer selected from the group consisting of acrylonitrile-butadiene-styrene terpolymers having a heat deformation temperature of 80° to 100°C (hereinafter abbreviated to ABS) and acrylonitrilemethyl methacrylate-butadiene-styrene quadripolymers having a heat deformation temperature of 80° to 100°C (hereinafter abbreviated to AMS), and having a favorable dimensional stability at elevated temperatures, moldability, and impact resistance, without losing the self-extinguishing property inherent to the Vc-PP copolymer In this invention, it is critical to use a Vc-PP copolymer as the polyvinyl chloride component. Although the heat deformation temperature can be improved by incorporating ABS and/or AMBS into homopolymer of vinyl chloride, the resulting composition is inferior in flow property so that the injection molding of a large-sized article becomes impossible.

As compared with the homopolymer of vinyl chloride, the polyvinyl chloride composition of this invention is easily processed by injection molding to give an article having a heat deformation temperature of 75° to 90°C, an excellent impact strength, and self-extinguishing property.

The Vc-PP copolymers to be used in this invention are those which have preferably a degree of polymerization of 400 to 5,000 and a propylene content of 1 to 10 % by weight, though the copolymers having other degrees of polymerization and other propylene contents may be used.

The interpolymer to be compounded with the Vc-PP copolymer can be ABS alone, AMBS alone, or a mixture of both. The ABS resins should have a heat deformation temperature (as measured in compliance with ASTM D 648, under a fiber stress of 66 psi) of 80° to 100°C and include those prepared by mixing an acrylonitrile-styrene copolymer latex and an acrylonitrile-butadiene copolymer latex to form a dispersion (blending method), by grafting an acrylonitrile-styrene copolymer onto a styrene-butadiene copolymer, by partial chemical combination of an acrylonitrile-styrene copolymer with an acrylonitrile-butadiene copolymer to form a graft-blend composite mixture, and by other method of preparation. If a thermally stable ABS having a heat deformation temperature higher than 100°C is used in compounding, owing to a large difference in fusion temperature between the ABS and the Vc-PP copolymer, both resins are not sufficiently compatible with each other, resulting in an injection-molded article containing the residual unfused ABS, and hence, having insufficiently developed a heat deformation temperature, moldability, and impact resistance, whereas if an ABS having a heat deformation temperature lower than 80°C is used in compounding, there is not obtained an injection-molded article having a heat deformation temperature of 75°C or more and at the same time, an excellent self-extinguishing property, that is, well-balanced performances.

As for the AMBS, similarly to the case of ABS, although any type may be used, the heat deformation temperature should be 80° to 100°C. If an AMBS having a heat deformation temperature lower than 80°C is used in compounding, there is not obtained an injection molded article having a heat deformation temperature of 75°C or more and, at the same time, an excellent self-extinguishing property and moldabillity, that is, moldability, properties, whereas if an AMBS having a heat deformation temperature higher than 100°C is used in compounding, owing to a large difference in fusion temperature between the AMBS and the Vc-PP copolymer, both resins are not sufficiently compatible with each other, resulting in an injection-molded article containing the residual unfused AMBS, and hence, having a dimensional stability at elevated temperatures, moldability, and impact resistance which are not developed to a full extent.

The amount of ABS or AMBS to be incorporated in Vc-PP copolymer is 40 to 60 % by weight per 60 to 40 % by weight of the Vc-PP copolymer, preferably 40 to 50 % by weight per 60 to 50 % by weight of Vc-PP copolymer. If the amount of ABS or AMBS used in compounding is less than 40 % by weight, a significant effect of improving the heat deformation temperature is not observed. Although the heat deformation temperature rises with an increase in amount of ABS and/or AMBS incorporated, an amount exceeding 60 % by weight is undesirable because the self-extinguishing property of Vc-PP copolymer will be lost. The object of this invention can also be achieved by incorporating simultaneously both ABS and AMBS in a total amount of 40 to 60 % by weight per 60 to 40 % by weight of the Vc-PP copolymer. When both types of the said interpolymers are simultaneously incorporated in a Vc-PP copolymer, if the total amount of the interpolymers is less than 40 % by weight, the heat deformation temperature cannot be raised above 75°C, while if the total amount exceeds 60 % by weight, the self-extinguishing property is lost, resulting in a vinyl chloride polymer composition having unbalanced properties in both cases. The ratio between ABS and AMBS is not critical, and any ratio may be practicable. Thus, in order to obtain a vinyl chloride polymer composition having both the heat deformation temperature of higher than 75°C and the self-extinguishing property by incorporating ABS or AMBS or both in a Vc-PP copolymer, it is absolutely necessary to use these interpolymers in a total amount of 40 to 60 % by weight per 60 to 40 % by weight of the Vc-PP copolymer.

Figure 2:
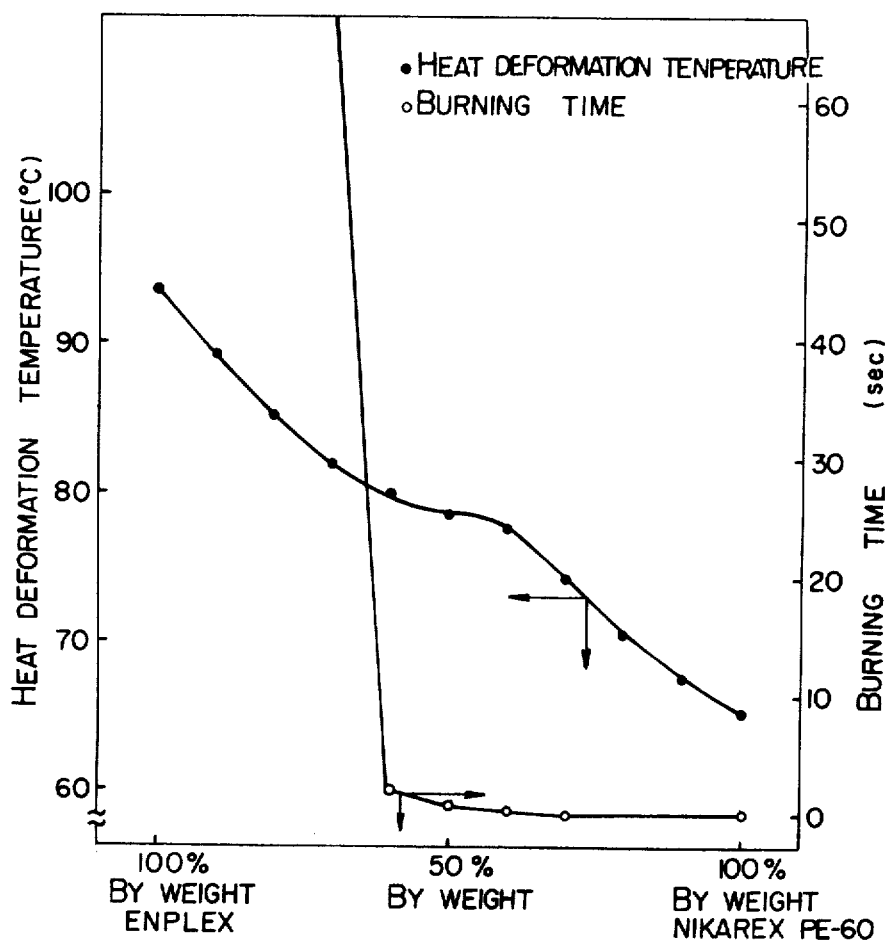
Figure 3:
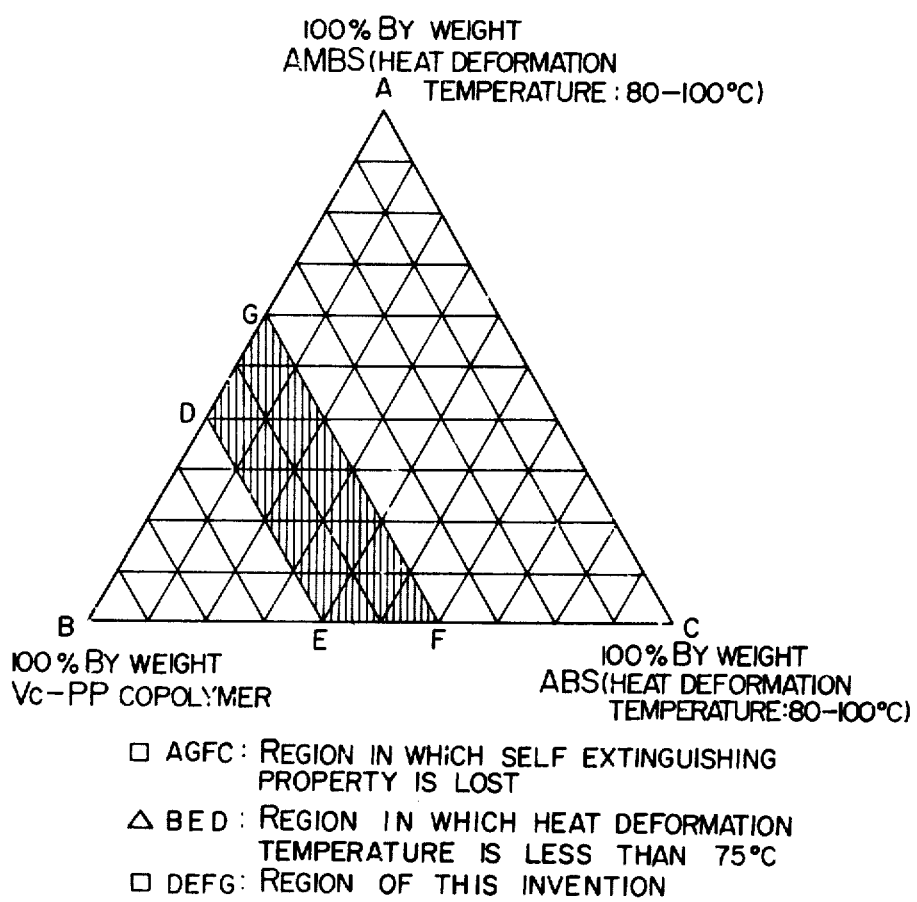

Referring to the accompanying drawings, the criticality of the compounding ratio between the Vc-PP copolymer and the ABS, the AMBS or both thereof is explained below. In the accompanying drawings, FIG. 1 is a graph showing a relationship between the heat deformation temperature and the compounding ratio of a Vc-PP copolymer (Nikarex PE-60 (propylene content: 2 %, degree of polymerization: 480): Nippon Carbide Industries Co., Ltd.) to an ABS (Kralastic MH: Sumitomo Naugatuck Co., Ltd.) and a relationship between the burning time and said compounding ratio, FIG. 2 is a graph showing a relationship between the heat deformation temperature and the compounding ratio of a Vc-PP copolymer (Nikarex PE-60) to an AMBS (Enplex: Kanegafuchi Chemical Industry Co., Ltd.) and a relationship between the burning time and said compounding ratio, and FIG. 3 is a graph showing a relationship between the compounding ratio among an ABS which has a heat deformation temperature of 80° to 100°C, an AMBS which has a heat deformation temperature of 80° to 100°C and a Vc-PP copolymer, and the formation of vinyl chloride polymer composition having a heat deformation temperature of 75°C or higher and a self-extinguishing property. As shown in FIG. 1; when Kralastic MH which is an ABS having a heat deformation temperature of 96.2°C is incorporated into a Vc-PP copolymer (Nikarex PE-60), the enhancement of the heat deformation temperature of the Vc-PP copolymer is not so great when the amount of Kralastic MH is less than 30 % by weight of the mixture, but becomes above 75°C from the point of 40 % by weight. That is to say, the relationship between the heat deformation temperature and the amount of the ABS forms an S curve having a break at 40 % by weight. When the amount of the ABS exceeds 60 % by weight, the heat deformation temperature becomes higher than 90°C, but the relationship between the burning time and the amount of the ABS forms an L curve having a break at 60 % by weight and the self-extiquishing property of the composition is greatly lost from this point. As shown in FIG. 2, when Enplex which is an AMBS having a heat deformation temperature of 93.7°C is incorporated into the Vc-PP copolymer (Nikarex PE-60), the relationship of the heat deformation temperature and the amount of the AMBS forms a curve having a break at 40 % by weight, and when the amount of the AMBS is less than 40 % by weight, the heat deformation temperature of the composition is less than 75°C. On the other hand, there is another break at 60 % by weight, and when the amount of the AMBS is more than 60 % by weight, the heat deformation temperature is again greatly enhanced, but the relationship between the burning time and the amount of AMBS forms an L curve having a break at 60 % by weight, and the self-extinguishing property of the composition is greatly lost from this point. As is clear from FIGS. 1 and 2, the purpose of this invention can be achieved by incorporating into the Vc-PP copolymer the ABS or the AMBS in a very specific amount, which is 40 to 60 % by weight based on the weight of the resulting mixture. Furthermore, the purpose of this invention can also be achieved by incorporating both the ABS and the AMBS each having a heat deformation temperature of 80° to 100°C, into the Vc-PP copolymer in a total amount of 40 to 60 % by weight based on the weight of the resulting mixture. As shown in FIG. 3, in the area AGFC, the heat deformation temperature is more than 75°C, but the self-extinguishing property is lost, and in the area BED, the self-extinguishing property is not lost, but the heat deformation temperature is less than 75°C. Therefore, the purpose of this invention cannot be accomplished. However, the area DEFG is the specific one in which a vinyl chloride polymer composition having balanced properties, namely, having a heat deformation temperature of at least 75°C without losing self-distinguishing property, is obtained by incorporating into the Vc-PP copolymer the ABS or the AMBS each having a heat deformation temperature of 80° to 100°C, in an amount of 40 to 60 % by weight, or both of the ABS and the AMBS in a total amount of 40 to 60 % by weight, based on the weight of the resulting mixture. Thus, in order to obtain a vinyl chloride polymer composition having a heat deformation temperature of at least 75°C and a self-extinguishing property by incorporating ABS, AMBS, each having a heat deformation temperature of 80° to 100°C, or both thereof into the Vc-PP copolymer, it is absolutely necessary that the interpolymer component is used in a total amount of 40 to 60 % by weight per 60 to 40 % by weight of the Vc-PP copolymer.

A homogeneous molding resin compound may easily be obtained by admixing the composition of this invention with stabilizers, and, if necessary, antioxidants, fillers, ultraviolet absorbers, pigments, and other additives customarily used for a vinyl chloride resin and by use of conventional machineries for processing vinyl chloride resin, such as a roll mill, Banbury mixer, or extruder, without necessitating special ones.

An MBS resin usually used in a vinyl chloride resin blend for the purpose of increasing the impact strength may, of course, be added so long as the amount of Vc-PP copolymer is not reduced below 40 % by weight and the amount of ABS and/or AMBS interpolymer is not reduced below 40 % by weight, based on the total weight of the resulting conposition.

It has been known that by incorporating a methyl methacrylate-butadiene-styrene terpolymer (hereinafter abbreviated to MBS), polyvinyl chloride can be improved in both moldability and impact resistance. However, the heat deformation temperature of MBS is generally low and when an MBS having a heat deformation temperature of 72°C in incorporated in a Vc-PP copolymer, with an increase in amount of the MBS, the impact resistance can be increased without moldability being much deteriorated, whereas the heat deformation temperature cannot be improved even if 50 % by weight of the Vc-PP copolymer is incorporated with 50 % by weight of MBS.

The characteristic features of the present vinyl chloride resin composition are an excellent dimensional stability at elevated temperatures, excellent flow property, and a self-extinguishing property. For instance, as shown in Example 1, by incorporating 50 % by weight of ABS in 50 % by weight of Vc-PP copolymer, there is obtained a vinyl chloride polymer composition having a heat deformation temperature of about 85°C, which shows on testing with a Koka-type flow tester an extruded volume 20 times as large as that of a vinyl chloride homopolymer under the same conditions and about 1.2 times as large as that of ABS alone. Accordingly, thin-walled articles, large-sized articles, or complicated articles with irregularities such as ribs and bosses may easily be obtained from the present composition by injection molding. The resulting articles have a beautiful appearance and a desirable gloss which allow to dispense with the troublesome buffing step which is necessary with conventional polystyrene and ABS articles. Because of favorable flow property, the present self-extinguishing resin composition gives on injection molding an article having a weld line, where the molten resin has fused together, which is much less noticeable than in the case of polystryene or ABS articles.

As shown in Example 1, when 50 % by weight of Vc-PP copolymer is compounded with 50 % by weight of ABS, there is obtained a composition which shows an impact strength more than twice as high as that of vinyl chloride homopolymer and a mar resistance, which shows susceptibility of the surface of articles to scratch, as well as organic solvent resistance both superior to those of ABS; the composition also shows a self-extinquishing property, the flammability class being VE-0 as measured by a burning test in compliance with UL-94.

The invention is further explained with reference to Examples which are by way of illustration and not by way of limitation. The tests in the Examples were conducted by the testing methods given below.

Testing method:
a. Heat deformation test: Conducted according to ASTM D 648, under a fiber stress of 66 psi. Test specimens were in the form of bar, ½ in. × ½ in. × 5 in. The mean value of three measurements was taken as the heat deformation temperature value.
b. Impact test: Conducted by Charpy test specified in JIS K 6745 (JIS: an abbreviation of Japanese Industrial Standards). The test specimen, 90 mm × 10 mm × 3 mm, had a V-shaped notch, 1 mm in depth. The impact value was given by the mean of five tests.
c. Kōka flow test: The test was conducted by means of a Kōka-type flow tester provided with a nozzle, 1 mm $\phi$ × 10 mm length. The amount of resin extruded in 1 second under a load of 150 kg was measured. The sample used was a pellet granulated by means of an extruder.
d. Mar resistance: Tested according to ASTM D 673. The test specimen was 30 mm × 50 mm × 2 mm in size. A No. 80 carborandum was used as the falling abrasive. The loss in surface gloss was measured by means of a glossmeter at a measurement angle of 45°.
e. Flammability test: Test was conducted according to UL-94. Test specimen was ⅛ in. × ½ in. × 5 in. in size.
f. Chemical resistance test: Test was conducted according to JIS K 6745. Test specimen was 25 mm × 50 mm × 1 mm in size. The mean of duplicate tests was taken as the chemical resistance value.

EXAMPLE 1

To each of the resin mixtures of the basic formulations of sampel No. 1 to No. 14 shown in Table 1, were added 2 parts by weight of dibutyltin maleate as stabilizer, 0.5 part by weight of calcium stearate also as stabilizer, 0.5 part by weight of stearic acid as lubricant, and 2 parts by weight of titanium oxide as pigment. Each of the resulting resin compositions was granulated by means of an extruder. The resin composition was milled by means of a 6 inch two-roller mixer at 185°C for 5 minutes; then using a 37-ton press, the milled composition was preheated at 185°C for 5 minutes, and pressed under a pressure of 100 kg/cm² for 3 minutes to prepare test specimens. As is apparent from the test results shown in Table 1, when 50 % by weight of a vinyl chloride homopolymer (S-9007 (degree of polymerization: 700) produced by Kureha Chemical Industry Co.) was compounded with 50 % by weight of Kralastic MH, the heat deformation temperature reached 87°C or higher, whereas the flow characteristic as measured by Kōka-type flow tester was not much improved. On the other hand, when the compounding ratio of Kralastic MH to Vc-PP copolymer exceeded 40 % by weight, the heat deformation temperature suddenly became higher and the flow characteristic was hardly deteriorated as compared with PE-60 and rather superior to Kralastic MH.

When an ABS having a heat deformation temperature of 68°C (Blendex 401, a trade name of UBE·CYCON Co., Ltd.) was incorporated in an amount of 50 % by weight as in Sample No. 12, no effect of enhancing the heat deformation temperature was observed. A thermally stable ABS (Kralastic K-2938, a trade name of Sumitomo Naugatuck Co., Ltd.) having a heat deformation temperature of 113.6°C as in Sample No. 13 was not compatible with Nikarex PE-60.

When two types of interpolymers, i.e. Kaneace B-12: Kanegafuchi Chemical Industry Co., Ltd. (MBS) and Kralastic MH, were simultaneously compounded with Nikarex PE-60, as in Sample No. 11, so as to keep the amount of the latter at a level not below 40 % by weight based on total amount of the resin mixture, and the amount of Kaneace B-12 at a level usually used for the purpose of improving the impact resistance, there was obtained a vinyl chloride polymer composition having a slef-extinguishing property, a high impact resistance, and a heat deformation temperature which was not much decreased. When the compounding ratio of Kralastic MH to Nikarex PE-60 remained below 60 % by weight, the burning time was below 5 seconds and the rating was VE-O, whereas when the compounding ratio of Kralastic MH exceeded 60 % by weight, the burning time became more than 60 seconds and the self-extinguishing properties were lost.

The relationships obtained in this Example between the compounding ratio of Kralastic MH to Nikarex PE-60 and the heat deformation temperature as well as the burning time were as shown in FIG. 1.

Table 1

| Sample No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Amount of compounding resin used (part by weight) | | | | | | | | | | | | | | |
| Vc-PP copolymer (Nikarex PE-60) | 0 | 0 | 100 | 70 | 60 | 50 | 40 | 30 | 50 | 0 | 40 | 50 | 50 | 0 |
| Polyvinyl chloride (Kureha S-9007) | 100 | 50 | 0 | 0 | 0 | 0 | 0 | 0 | 0 | 0 | 0 | 0 | 0 | 0 |
| ABS (Kralastic MH) | 0 | 50 | 0 | 30 | 40 | 50 | 60 | 70 | 0 | 100 | 50 | *50 | **50 | 0 |
| MBS (Kaneace B-12) | 0 | 0 | 0 | 0 | 0 | 0 | 0 | 0 | 50 | 0 | 10 | 0 | 0 | 100 |
| Heat deformaton temperature (°C) | 70.4 | 87.7 | 64.8 | 68.3 | 79.8 | 85.4 | 90.1 | 92.8 | 66.9 | 96.2 | 88.6 | 67.4 | Not compatible | 72.0 |
| Flow by Kōka-type flow tester (180°C) (cm³/sec.) | 7.3 ×10⁻⁴ | 7.8 ×10⁻³ | 2.5 ×10⁻² | 2.2 ×10⁻² | 2.1 ×10⁻² | 1.9 ×10⁻² | 1.8 ×10⁻² | 1.6 ×10⁻² | 9.2 ×10⁻³ | 1.5 ×10⁻² | 1.5 ×10⁻² | 2.1 ×10⁻² | Not compatible | 9.0 ×10⁻³ |
| Impact Strength (kg-cm/cm²) | 7.6 | 13.5 | 3.8 | 10.4 | 12.4 | 14.8 | 17.2 | 19.6 | 71.5 | 22.4 | 25.1 | 18.6 | Not compatible | >100 |
| Flammability rating | VE-O | VE-O | VE-O | VE-O | VE-O | VE-O | burnt | VE-O | burnt | VE-O | VE-O | | | burnt |

Table 1-continued

| Sample No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Burning time (sec.) | 0 | 1.3 | 0 | 0 | 0.2 | 1.3 | 3.9 | >60 | 1.5 | >60 | 4.2 | 1.6 | | >60 |
| Mar. resistance (falling sand 200g) (%) | 28 | 35 | 28 | 31 | 33 | 35 | 38 | 44 | — | 48 | 38 | 35 | | — |
| Chemical resistance (gasoline) (g/m²) | 0.1 | 0.3 | 0.1 | 0.1 | 0.1 | 0.3 | 0.5 | 0.9 | — | 1.4 | 0.5 | 0.3 | | — |
| " (alcohol) (g/m²) | 0.0 | 0.2 | 0.0 | 0.0 | 0.1 | 0.2 | 0.6 | 1.2 | — | 1.8 | 0.6 | 0.2 | | — |
| " (10% soap solution) (g/m²) | 0.0 | 0.3 | 0.0 | 0.0 | 0.1 | 0.3 | 0.7 | 1.4 | — | 2.1 | 0.7 | 0.3 | | — |

Note:
*ABS (Blendex 401 (the heat deformation temperature 68.0°C))
**ABS (Kralastic K-2938 (The heat deformation temperature 113.6°C))

EXAMPLE 2

To each of the resin mixtures of the basic formulations of Sample No. 15 to No. 26 shown in Table 2, were added 2 parts by weight of dibutyltin maleate as stabilizer, 0.5 part by weight of calcium stearate as stabilizer, 0.5 part by weight of stearic acid as lubricant, and 2 parts by weight of titanium oxide as pigment. Each of the resulting resin compositions was granulated by means of an extruder.

The resin composition was milled by means of a 6-inch two-roll mixer at 185°C for 5 minutes; then using a 37-ton press, the milled composition was preheated at 185°C for 5 minutes, and pressed under a pressure of 100 kg/cm² for 3 minutes to prepare test specimens. As is apparent from the results shown in Table 2, when 50 % by weight of an AMBS (Enplex, produced by Kanegafuchi Chemical Industry Co.) was incorporated in a vinyl chloride homopolymer (Kureha S-9007, produced by Kreha Chemical Industry Co.), as in Sample No. 16, the heat deformation temperature reached 80°C, or higher, whereas the flow characteristic was not much8c improved.

On the other hand, when Nikarex PE-60 was compounded with Enplex, the heat deformation temperature reached 75°C or higher at the incorporated amount of the latter of 40 % by weight and 80°C at the incorporated amount of 60 % by weight; the flow characteristic was improved to some extent, the extruded amount being about twice as large as that of sample No. 16 and more than 30 times as large as that of Kureha S-9007; the impact strength was also improved as compared with Kureha S-9007. The results obtained were as shown in Table 2 and FIG. 2.

When the compounding ratio of Enplex to Nikarex PE-60 remained below 60 % by weight, the burning time was below 5 seconds, the rating being VE-O, whereas when the compounding ratio of Enplex exceeded 60 % by weight, the burning time became more than 60 seconds and the self-extinguishing property was lost.

EXAMPLE 3

To each of the resin mixtures of the basic formulations of sample No. 27 to No. 43 shown in Table 3, were added 2 parts by weight of dibutyltin maleate as stabilizer, 0.5 part by weight of calcium stearate as stabilizer, 0.5 part by weight of stearic acid as lubricant, and 2 parts by weight of titanium oxide as pigment. Each of the resulting resin compositions was granulated by means of an extruder.

The resin composition was milled on a 6-inch two-roll mixer at 185°C for 5 minutes; then using a 37-ton press, the milled composition was preheated at 185°C for 5 minutes, and pressed under a pressure of 100 kg/cm² for 3 minutes to prepare test specimens.

As is evident from the results shown in Table 3, it was found that when Nikarex PE-60 (a Vc-PP copolymer) was compounded with 40 to 60 % by weight in total of two interpolymers, i.e. Kralastic MH (an ABS) and Enplex (an AMBS), in varying ratios, the resulting resin compositions showed a heat deformation temperature of 75°C or higher and a flow characteristic which is superior to that of Kralastic MH and not much inferior to that of Nikarex PE-60. When Nikarex PE-60 was compounded with less than 40 % by weight in total of two interpolymers, i.e. Kralastic MH and Enplex, the resulting resin compositions showed a heat deformation temperature of below 75°C, whilst when the total amount of said two interpolymers was more than 60 % by weight, the burning time became 60 seconds or more and the self-extinguishing property was lost. Such relationships are shown in FIG. 3 of the accompanying drawings. Thus, it is clear that in order to achieve the object of this invention by imparting to the resin composition well-balanced performances, i.e. both an excellent heat deformation temperature and a self-extinguishing property, the total amount of the said two interpolymers to be incorporated should be in the range from 40 to 60 % by weight.

Table 2

| Sample No. | 15 | 16 | 17 | 18 | 19 | 20 | 21 | 22 | 23 | 24 | 25 | 26 |
|---|---|---|---|---|---|---|---|---|---|---|---|---|
| Amount of compounding resin used (part by weight) | | | | | | | | | | | | |
| Vc-PP copolymer (Nikarex PE-60) | 0 | 0 | 100 | 70 | 60 | 50 | 40 | 30 | 0 | 0 | 60 | 40 |
| Polyvinyl chloride (Kureha S-9007) | 100 | 50 | 0 | 0 | 0 | 0 | 0 | 0 | 0 | 50 | 0 | 0 |
| AMBS (Keneka Enplex) | 0 | 50 | 0 | 30 | 40 | 50 | 60 | 70 | 100 | 0 | 30 | 50 |
| MBS (Kaneace B-12) | 0 | 0 | 0 | 0 | 0 | 0 | 0 | 0 | 0 | 50 | 10 | 10 |
| Heat deformation temperature | 70.4 | 81.5 | 64.8 | 73.2 | 77.0 | 78.3 | 79.8 | 81.8 | 93.7 | 71.2 | 73.7 | 78.0 |

Table 2-continued

| Sample No. | 15 | 16 | 17 | 18 | 19 | 20 | 21 | 22 | 23 | 24 | 25 | 26 |
|---|---|---|---|---|---|---|---|---|---|---|---|---|
| (°C) | | | | | | | | | | | | |
| Flow by Koka-type flow tester (180°C, cm$^3$/sec.) | $7.3 \times 10^{-4}$ | $1.3 \times 10^{-2}$ | $2.5 \times 10^{-2}$ | $2.6 \times 10^{-2}$ | $2.6 \times 10^{-2}$ | $2.6 \times 10^{-2}$ | $2.6 \times 10^{-2}$ | $2.7 \times 10^{-2}$ | $2.8 \times 10^{-2}$ | $4.8 \times 10^{-3}$ | $2.3 \times 10^{-2}$ | $2.4 \times 10^{-2}$ |
| Impact strength (kg-cm/cm$^2$) | 7.6 | 13.8 | 3.8 | 7.1 | 8.4 | 11.3 | 12.6 | 14.5 | 16.4 | >72 | 15.3 | 22.1 |
| Flammability rating | VE-0 | VE-0 | VE-0 | VE-0 | VE-0 | VE-0 | VE-0 | burnt | burnt | VE-0 | VE-0 | VE-0 |
| Burning time (sec.) | 0 | 0.6 | 0 | 0 | 0.2 | 1.1 | 2.3 | >60 | >60 | 1.1 | 0.3 | 2.5 |
| Mar resistance (falling sand 200 g) (%) | 28 | 34 | 28 | 30 | 32 | 34 | 36 | 42 | 46 | — | 32 | 36 |
| Chemical resistance (gasoline) (g/m$^2$) | 0.1 | 0.3 | 0.1 | 0.1 | 0.1 | 0.3 | 0.4 | 0.6 | 1.8 | — | 0.1 | 0.4 |
| ,, (alcohol) (g/m$^2$) | 0.0 | 0.2 | 0.0 | 0.0 | 0.1 | 0.2 | 0.6 | 1.2 | 1.7 | — | 0.1 | 0.6 |
| ,, (10% soap solution) (g/m$^2$) | 0.0 | 0.3 | 0.0 | 0.0 | 0.1 | 0.3 | 0.5 | 0.7 | 2.4 | — | 0.1 | 0.5 |

Table 3

| Sample No. | 27 | 28 | 29 | 30 | 31 | 32 | 33 | 34 |
|---|---|---|---|---|---|---|---|---|
| Amount of compounding resin used (part by weight) | | | | | | | | |
| Vc-PP copolymer (Nikarex PE-60) | 70 | 60 | 60 | 60 | 60 | 50 | 50 | 50 |
| ABS (Kralastic MH) | 20 | 10 | 20 | 30 | 20 | 10 | 20 | 30 |
| AMBS (Kaneka Enplex) | 10 | 30 | 20 | 10 | 10 | 40 | 30 | 20 |
| MBS (Kaneace B-12) | 0 | 0 | 0 | 0 | 10 | 0 | 0 | 0 |
| Heat deformation temperature (°C) | 71.8 | 77.4 | 78.0 | 78.7 | 73.1 | 79.6 | 81.1 | 82.8 |
| Flow by Koka-type flow tester (180°C., cm$^3$/sec.) | $2.3 \times 10^{-2}$ | $2.5 \times 10^{-2}$ | $2.3 \times 10^{-2}$ | $2.2 \times 10^{-2}$ | $2.1 \times 10^{-1}$ | $2.5 \times 10^{-2}$ | $2.3 \times 10^{-2}$ | $2.1 \times 10^{-2}$ |
| Impact strength (kg-cm/cm$^2$) | 8.2 | 9.1 | 10.3 | 11.6 | 16.4 | 12.2 | 13.0 | 13.5 |
| Flammability rating | VE-0 | VE-0 | VE-0 | VE-0 | VE-0 | VE-0 | VE-0 | VE-0 |
| Burning time (sec.) | 0 | 0.2 | 0.4 | 0.3 | 0.7 | 1.0 | 1.3 | 1.2 |
| Mar resistance (falling sand 200g) (%) | 30 | 33 | 31 | 32 | 33 | 34 | 34 | 36 |
| Chemical resistance (gasoline) (g/m$^2$) | 0.1 | 0.1 | — | 0.2 | 0.2 | 0.3 | — | — |
| ,, (alcohol) (g/m$^2$) | 0.0 | 0.1 | — | 0.1 | 0.1 | 0.2 | — | — |
| ,, (10% soap solution) (g/m$^2$) | 0.0 | 0.1 | −0.1 | 0.1 | 0.3 | — | — | — |

| Sample No. | 35 | 36 | 37 | 38 | 39 | 40 | 41 | 42 | 43 |
|---|---|---|---|---|---|---|---|---|---|
| Amount of compounding resin using (part by weight) | | | | | | | | | |
| Vc-PP copolymer (Nikarex PE-60) | 50 | 50 | 40 | 40 | 40 | 40 | 40 | 40 | 30 |
| ABS (Kralastic MH) | 40 | 30 | 10 | 20 | 30 | 40 | 50 | 40 | 10 |
| AMBS (Kaneka Enplex) | 10 | 10 | 50 | 40 | 30 | 20 | 10 | 10 | 60 |
| MBS (Kaneace B-12) | 0 | 10 | 0 | 0 | 0 | 0 | 0 | 10 | 0 |
| Heat deformation temperature (°C) | 84.3 | 81.3 | 81.0 | 82.8 | 84.6 | 86.8 | 88.3 | 87.1 | 83.2 |
| Flow by Koka-type flow tester (180°C., cm$^3$/sec.) | $1.9 \times 10^{-2}$ | $2.0 \times 10^{-2}$ | $2.4 \times 10^{-2}$ | $2.0 \times 10^{-2}$ | $2.1 \times 10^{-2}$ | $1.9 \times 10^{-2}$ | $1.8 \times 10^{-2}$ | $1.8 \times 10^{-2}$ | $2.5 \times 10^{-2}$ |
| Impact strength (kg-cm/cm$^2$) | 14.0 | 20.6 | 13.7 | 14.3 | 15.6 | 16.4 | 17.0 | 23.1 | 16.3 |
| Flammability rating | VE-0 | VE-0 | VE-0 | VE-0 | VE-0 | VE-0 | VE-0 | VE-0 | burnt |
| Burning time (sec) | 1.4 | 1.7 | 3.7 | 3.0 | 3.3 | 2.9 | 3.5 | 3.6 | >60 |
| Mar resistance (falling sand 200g) (%) | 35 | 35 | 38 | 39 | 38 | 38 | 37 | 38 | 42 |
| Chemical resistance (gasoline) (g/m$^2$) | 0.3 | 0.3 | 0.4 | — | — | — | 0.5 | 0.5 | 0.7 |
| ,, (alcohol) (g/m$^2$) | 0.3 | 0.3 | 0.6 | — | — | — | 0.6 | 0.6 | 1.3 |
| ,, (10% soap solution) (g/m$^2$) | 0.3 | 0.3 | 0.4 | — | — | — | 0.6 | 0.6 | 1.0 |

EXAMPLE 4

To 100 parts by weight of a resin mixture obtained by compounding 50 % by weight of a Vc-PP copolymer (Nikarex PE-60) with 50 % by weight of an ABS (Kralastic MH), were added 3 parts by weight of dibasic lead phosphite, 1 part by weight of lead stearate, 1 part by weight of barium stearate, said three compounds having been used as stabilizer, and 2 parts by weight of titanium oxide as pigment. The resulting resin compostion was granulated by means of an extruder. The resin composition was processed by using a 35-oz. in-line screw type injection machine, the temperature gradient along the heating cylinder starting from the hopper end being 115°–150°–165°–170°C, and by using a twin-cavity mold to obtain a box-type article, 220 mm ×140 mm ×100 mm in size and 3 mm in wall thickness. The article obtained weighed 740 g and had beautiful appearance, no dullness having been shown on the surface and the weld line having been hardly noticeable. The dimensional change of the article after having been kept in a hot-air circulating oven at 90°C for 2 hours was 0.6 %.

EXAMPLE 5

To 100 parts by weight of a resin mixture obtained by incorporating 40 % by weight of an ABS (Kralastic MH) and 10 % by weight of a MBS (Kaneace B-12) into 50 % by weight of a Vc-PP copolymer (Nikarex PE-60) were added 3 parts by weight of dibutyltin maleate as stabilizer, 1 part by weight of stearic acid as lubricant, and 1 part by weight of carbon black as pigment. The resulting resin composition was granulated by means of an extruder. The resin composition was molded by using a 20-oz. in-line screw type injection machine, the temperature gradient along the heating cylinder starting from the hopper end being 120°-135°-150°-165°C, and by use of a mold which gave a molded article, 350 mm × 100 mm × 30 mm in size and 2 mm in wall thickness. The molded article was in the form of complicated plate, weighting 185 g and having many ribs on the surface forming a grid and bosses to mount the article on other machine part. The article had beautiful appearance with gloss, and neither dullness nor decomposition products were observed. After having been kept in a hot-air circulating oven at 80°C for 2 hours, the article showed a dimensional change of 0.4 % and withstood an impact force of 1.5 ft. lb.

EXAMPLE 6

To 100 parts by weight of a resin mixture obtained by compounding 60 % by weight of a Vc-PP copolymer (Nikarex PE-60) with 40 % by weight of an AMBS (Kaneka Enplex), were added 2 parts by weight of dibutyltin maleate as stabilizer, 1 part by weight of stearic acid as lubricant, and 1 part by weight of carbon black as pigment. The resulting resin composition was granulated by means of an extruder.

The vinyl chloride polymer composition thus obtained was molded by using a 55-oz. in-line screw type injection machine, the temperature gradient along the heating cylinder starting from the hopper end being 115°-150°-160°-165°-170°C, and by use of a mold which gave a molded article, 600 mm ×400 mm ×20 mm in size and 2.7 mm in wall thickness. The molded article was in the form of complicated plate with irregularities, weighting 655 g and having bosses to mount the article on other machine part.

The article had beautiful glossy appearance and neither dullness nor decomposition products were observed. After having been kept in a hot-air circulating oven at 75°C for 2 hours, the article showed a dimensional change of 0.5 % and sufficiently withstood an impact force of 5 ft.lb.

EXAMPLE 7

To 100 parts by weight of a resin mixture obtained by incorporating 30 % by weight of an ABS (Kralastic MH), 10 % by weight of an AMBS (Kaneka Enplex), and 10 % by weight of a MBS (Kaneace B-12) into 50 % by weight of a Vc-PP copolymer (Nikarex PE-60) were added 2 parts by weight of dibutyltin maleate as stabilizer, 0.5 part by weight of calcium stearate as stabilizer, 0.5 part by weight of stearic acid as lubricant, and 1 part by weight of carbon black as pigment. The resulting resin composition was granulated by means of an extruder.

The vinyl chloride polymer composition thus obtained was molded by using a 15-oz. in-line screw type injection machine, the temperature gradient starting from the hopper end being 130°-150°-170°-180°C, and by use of a mold which gave a molded article in the form of bowl, 155 mm in diameter. The molded article weighed 155 g and had beautiful and glossy appearance. After having been kept in a hot-air circulating oven at 80°C for 4 hours, the article showed a dimensional change of 0.7 % and withstood an impact force of 1.5 ft. lb.

When subjected to a flammability test according to UL 94, the article showed a burning time of 1.7 seconds, and hence, may be classified as self-extinguishing, corresponding to a flammability class of VE-O which is sufficient for practical use.

What is claimed is

1. A vinyl chloride polymer composition comprising 40–50% by weight of a vinyl chloride-propylene copolymer and 60–50% by weight of a quadripolymer of acrylonitrile, butadiene, methyl methacrylate and styrene, said quadripolymer having a heat deformation temperature of 80°to 100°C.

2. A composition according to claim 1, wherein the vinyl chloride-propylene copolymer has a degree of polymerization of 400 to 5,000, and a propylene content of 1 to 10% by weight.

3. A part for electric instruments and appliances obtained by subjecting the composition according to claim 1 to injection-molding.

4. A vinyl chloride polymer composition consisting essentially of 40 to 50% by weight of a vinyl chloride-propylene copolymer and 60 to 50% by weight in total of a major proportion of an acrylonitrile-butadiene-styrene terpolymer having a heat deformation temperature of 80° to 100°C and a proportion of an acrylonitrile-methyl methacrylate-butadienestyrene quadripolymer having a heat deformation temperature of 80° to 100°C.

5. A composition according to claim 4, wherein the quadripolymer to the terpolymer weight ratio ranges from 1/1 to 1/5.

6. A vinyl chloride polymer composition comprising 40–50% by weight of a vinyl chloride-propylene copolymer and 60–50% by weight of a mixture of an acrylonitrilebutadinene-styrene terpolymer and an acrylonitrile-methyl methacrylate-butadiene-styrene quadripolymer, said terpolymer and said quadripolymer each having a heat deformation temperature of 80° to 100°C, the weight ratio of the quadripolymer to the terpolymer being from 1/1 to 1/5.

7. A vinyl chloride polymer composition composition according to claim 6, wherein the vinyl chloridepropylene copolymer has a degree of polymerization of 400 to 5000, and a propylene content of 1 to 10% by weight.

8. A part for electric instruments and appliances obtained by subjecting the composition according to claim 6 to injection-molding.

* * * * *